(12) United States Patent
Zhou et al.

(10) Patent No.: US 11,443,207 B2
(45) Date of Patent: Sep. 13, 2022

(54) AGGREGATED FEATURE IMPORTANCE FOR FINDING INFLUENTIAL BUSINESS METRICS

(71) Applicant: Capital One Services, LLC, McLean, VA (US)

(72) Inventors: Yasong Zhou, Carrollton, TX (US); Wayne Decesaris, Frisco, TX (US); Esmat Zare, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 357 days.

(21) Appl. No.: 16/816,400

(22) Filed: Mar. 12, 2020

(65) Prior Publication Data

US 2021/0287111 A1 Sep. 16, 2021

(51) Int. Cl.
*G06F 15/18* (2006.01)
*G06N 5/04* (2006.01)
*G06N 20/00* (2019.01)
*G06Q 10/06* (2012.01)
*G06Q 30/02* (2012.01)
*G06Q 30/00* (2012.01)
*G06Q 10/10* (2012.01)

(52) U.S. Cl.
CPC ............... *G06N 5/04* (2013.01); *G06N 20/00* (2019.01); *G06Q 10/0639* (2013.01); *G06Q 10/10* (2013.01); *G06Q 30/016* (2013.01); *G06Q 30/0203* (2013.01)

(58) Field of Classification Search
CPC .......... G06N 5/04; G06N 20/00; G06N 5/003; G06N 20/20; G06Q 10/0639; G06Q 10/10; G06Q 30/016; G06Q 30/0203
USPC ............................................ 706/12; 455/418
See application file for complete search history.

(56) References Cited

U.S. PATENT DOCUMENTS

2021/0045043 A1\* 2/2021 Shannon ............... H04W 48/04

\* cited by examiner

*Primary Examiner* — Marcos Batista
(74) *Attorney, Agent, or Firm* — Hunton Andrews Kurth LLP

(57) ABSTRACT

Systems, methods, and apparatuses for determining feature importance of analytics data in predicting a response value include receiving data records, each data record including a response value and values of features associated with the response value; splitting the data records into datasets, each dataset including a part of the data records; generating a machine learning model using each of the datasets, the machine learning model outputting one or more predicting features having influence in predicting the response value for each of the datasets; determining an important feature based on the one or more predicting features; and generating report data indicating that a business metric associated with the important feature has the highest predicted influence among the features on predicting the response value.

20 Claims, 6 Drawing Sheets

| User A | Response Value A | Feature 1 | Feature 2 | ... | Feature N |
| User B | Response Value B | Feature 1 | Feature 2 | ... | Feature N |
| User C | Response Value C | Feature 1 | Feature 2 | ... | Feature N |
| User D | Response Value D | Feature 1 | Feature 2 | ... | Feature N |

FIG. 2

AGGREGATED FEATURE IMPORTANCE FOR FINDING INFLUENTIAL BUSINESS METRICS

TECHNICAL FIELD

This disclosure concerns data science techniques. In particular, this disclosure concerns methods and systems of finding influential features in predicting a response value by aggregating feature importance of analytics data and adjusting tangible procedures in response.

BACKGROUND

In customer data analytics, information about a customer's experience with a business may be collected through surveys. The surveys may ask the customer about various aspects of the customer's interactions with the business and satisfaction with the interactions. The surveys may also ask the customer about the overall satisfaction with the business. The customer data analytics strives to determine which aspect or aspects ("business metrics") of the interactions may be influential in the customer's satisfaction level. Once those business metrics are determined, the business may improve them to increase the customer's satisfaction level.

The conventional survey approach has several disadvantages, however. Typically, the surveys collect imperfect data (e.g., having small sample sizes, incomplete entries, etc.), which may cause unreliable customer data analytics (e.g., multicollinearity in the predicted results). Accordingly, no known technique exists for generating predictive and reliable customer data analytics results, as attained with aspects of the disclosed embodiments. These aspects provide many technical improvements, including minimally suppressing multicollinearity in customer data analytics results, automatizing generation of large nearly-independent data samples for analytics based on small survey dataset, suppressing sensitivity to initial condition of customer data analytics, and increasing reliability of the analytic results. Business processes may be benefited from such results by increasing customer satisfaction or reducing potential risks from high-risk customers.

SUMMARY

Consistent with the present embodiments, a system for determining feature importance of analytics data in predicting a response value is disclosed, the system comprising at least one processor and at least one non-transitory memory storing instructions to perform operations when executed by the at least one processor. The operations include receiving data records, each data record comprising a response value and values of features associated with the response value; splitting the data records into datasets, each dataset comprising a part of the data records; generating a machine learning model using each of the datasets, the machine learning model outputting one or more predicting features having influence in predicting the response value for each of the datasets; determining an important feature based on the one or more predicting features; and generating report data indicating that a business metric associated with the important feature has the highest predicted influence among the features on predicting the response value.

Consistent with the present embodiments, a method for determining feature importance of analytics data in predicting a response value is disclosed. The method includes receiving data records, each data record comprising a customer satisfaction score and values of features associated with the response value; splitting the data records into datasets, each dataset comprising a training dataset for training the machine learning model and a validation dataset for validating the machine learning model; generating a machine learning model using each of the datasets, the machine learning model outputting one or more predicting features having influence in predicting the response value for each of the datasets; determining an important feature based on the one or more predicting features; and generating report data indicating that a business metric associated with the important feature has the highest predicted influence among the features on predicting the response value.

Consistent with other disclosed embodiments, a non-transitory computer readable storage medium may store program instructions, which are executed by at least one processor device and perform operations. The operations include receiving survey response data records, each survey response data record comprising a response value and values of features associated with the response value; splitting the data records into datasets, each dataset comprising a part of the data records; generating a machine learning model using each of the datasets, the machine learning model outputting one or more predicting features having influence in predicting the response value for each of the datasets; determining an important feature based on the one or more predicting features; and generating report data indicating that a business metric associated with the important feature has the highest predicted influence among the features on predicting the response value.

The foregoing general description and the following detailed description are example and explanatory only and are not restrictive of the claims.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 2 is a schematic diagram of exemplary structures of data records of the collected analytics data in FIG. 1 consistent with disclosed embodiments.

DETAILED DESCRIPTION

Figure 1:
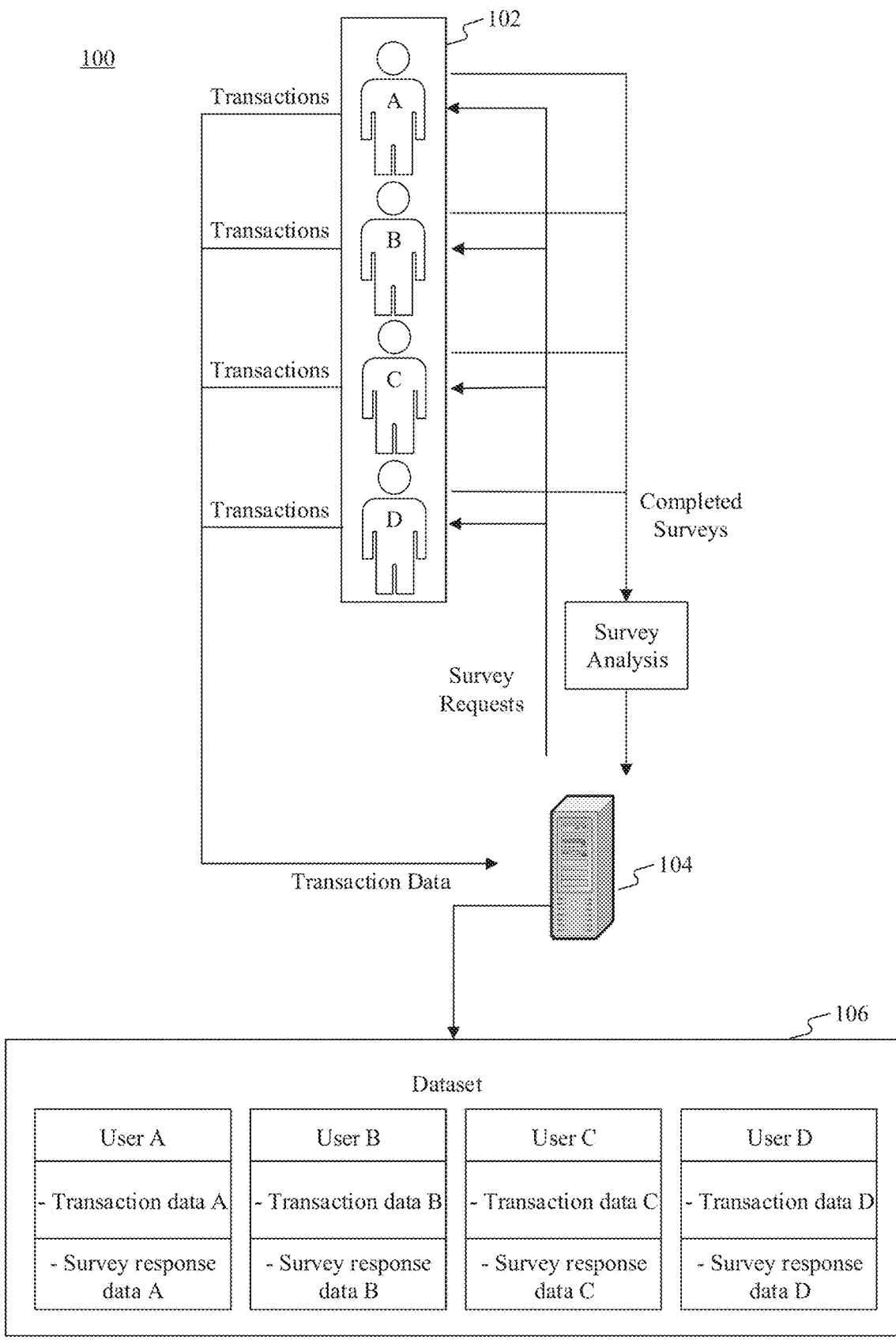
FIG. 1 is a schematic diagram of an exemplary system for collecting analytics data consistent with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail disclosed herein. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof may occur or be performed simultaneously, at the same point in time, or concurrently.

Reference will now be made in detail to the disclosed embodiments, examples of which are illustrated in the accompanying drawings.

Many applications, such as financial systems, supply line management, transportation, and industrial processes, use ineffective customer surveys in an attempt determine levels of customer satisfaction. This approach suffers from several drawbacks. For example, a response rate of surveys collected from customers may below, and survey datasets generated from the surveys may have a small size. In those situations, existing data science methods do not work well. For example, when the size of the survey dataset is small, the inputted survey datasets may have business metrics nonlinearly correlated or multicollinearly correlated with the target variables. When nonlinearity occurs (e.g., in the linear regression methods), the relationship between the predictive variables and the target variables may be essentially nonlinear, in which a linear modeling may not generate trusted an influential feature ("feature importance"). When multicollinearity occurs (e.g., in the data mining methods), the predictive variables may be not only related to the target variables, but also correlated to each other. That is, different combinations of input variables may predict similar values of the target variables with similar levels of accuracy. Such a result may conceal which business metrics are truly influential.

This disclosure provides methods (e.g., predictive modeling methods) and systems for discovering relationships between customer analytics data and levels of customer satisfaction. For example, the customer analytics data may be inputted as various forms of independent variables ("predictive variables"). The customer satisfaction may be outputted as dependent variables ("target variables"). Various predictive modeling methods may be used for the customer data analytics, such as linear regression methods or data mining methods (e.g., machine learning methods). Those methods may input survey datasets as predictive variables, such as being grouped by features (e.g., business metrics), and output target variables such as customer satisfaction scores. Based on comparing values of the target variables, the feature importance may be predicted. The influential features may indicate, for example, that the corresponding business metrics have high influence in predicting the customer satisfaction scores. That is, the influence features have great contribution in the process of mapping the inputted survey datasets to the customer satisfaction scores. By identifying the influential features, the operator or manager of the applications may direct resources to solve problems or improve conditions in the business metrics indicated by the influential features, and thus the customer satisfaction level may be increased.

For further reducing nonlinearity and multicollinearity between the predictive variables and the target variables as present in existing data science methods, especially in cases when the size of the survey dataset is small, the methods and systems disclosed herein may use recursive feature elimination methods. The recursive feature elimination methods may reduce the number of the input variables by eliminating input variables that are highly correlated with the target variables of the predictive methods. For example, the recursive feature elimination method may be a repeated holdout validation (RHV) method. The RHV method may be used to build a machine learning model. In the RHV method, subsets of the survey datasets are repeatedly and differently selected and used to train the machine learning model, while using the remainder of the survey datasets for model validation. The subset used for training the machine learning model may be referred to as a "training dataset" herein. The subset used for validating the trained machine learning model may be referred to as a "validation dataset" herein. Parameters of the machine learning model may be updated during the training using the training dataset, and the training of the machine learning model may be determined as completed when it is correctly validated using the validation dataset, such as by correctly outputting the target variables when using the validation dataset as input. The RHV method may generate random numbers ("random seeds") for initializing the machine learning models and determining how to split the survey datasets to generate the training datasets and the validation datasets.

In some implementations, the recursive feature elimination methods may be sensitive on values of the random seeds. For example, a small variation on the values of the random seeds may lead to a huge difference on the values of the outputted target variables. Accordingly, the machine leaning methods may predict different business metrics as influential features. For example, the machine learning model may predict a first influential feature and a second influential feature by using a first random seed and a second random seed, respectively. In this case, it is difficult to determine whether the first influential feature or the second influential feature is the true influential feature. In other words, the multicollinearity may not be fully eliminated by the recursive feature elimination methods.

For improving the disclosed methods and systems, especially for addressing the issues of multicollinearity caused by sensitivity to small data size of machine learning models, the methods and systems disclosed herein introduce an aggregation method of generating an aggregated feature importance (AFI). In some embodiments, the aggregation method may generate a group of different random seeds that have different random values. The random seeds may be used to split the survey datasets into different combinations of training datasets and validation datasets. The random seeds may also be used to initialize machine learning models, in which each machine learning model may use one of the combinations of training datasets and validation datasets for training and validation. A group of machine learning models may be built using the above process (with different random seeds and dataset combinations only), but may output different influential features. For example, each of the machine learning models may output a set of influential features. An aggregation may be performed on the outputted influential features to determine a rank order of feature importance or most influential feature ("important feature"). For example, in some embodiments, the outputted influential feature having the highest frequency among the outputted influential features may be selected as the important feature. By applying the aggregation method, not only may the identified important feature avoid sensitivity to the variations of the initial condition of machine learning building processes (e.g., variations of random seeds or dataset sizes), the multicollinearity problem may also be greatly reduced or even eliminated entirely.

Consistent with the disclosed embodiments herein, datasets may include elements corresponding to real-world conditions, events, and/or measurements. The elements may include variables having associated values. The variables may include independent and dependent variables, where independent variables correspond to actual or potential model parameters and dependent variables correspond to actual or potential model outputs. The datatypes of the values are not intended to be limiting. For example, a dataset may include transaction data, financial data, demographic data, public data, government data, environmental data, traffic data, network data, transcripts of video data, and/or other data. A dataset may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Consistent with disclosed embodiments, a machine learning model may include a decision tree model, random forest model, regression model (e.g., linear or logistic regression model), support vector machine, k-nearest neighbor model, neural network, or the like. Given a set of input data, the machine learning model may generate a label or classification for the input data, predict a corresponding set of output data, or perform other tasks. The machine learning model may be trained using a set of training data. Depending on the type of machine learning model, this training may be supervised, semi-supervised, or unsupervised. The machine learning model may be implemented using one or more computing devices (e.g., wearable device, smartphone, laptop, desktop, workstation, server, cloud computing platform, or the like). The one or more computing devices may be configured to obtain input data. For example, the one or more computing devices may generate the input data (e.g., by taking measurements), receive the input data (e.g., from other devices), and/or retrieve the input data (e.g., from one or more remote or local databases).

FIG. 1 is a schematic diagram of a system 100 for collecting analytics data consistent with disclosed embodiments. As depicted in FIG. 1, users 102 may be associated with transactions (e.g., users 102 may conduct the transactions, be associated with a financial services account used to conduct the transactions, be legally responsible for the transactions, or the like). For example, the transactions may be applications to loans (e.g., auto loans, student loans, mortgages, personal loans, or the like). Server 104 may be configured to record transaction data detailing the transactions. In some embodiments, server 104 may be part of a financial service system associated with a financial institution or may obtain the transaction data from such a financial service system. The transaction data may include, as a nonlimiting example, an indication a user associated with the transaction (e.g., account number, user identifier, or the like), transaction amount, transaction time, geographic transaction location, counterparty (e.g., the individual or entity with whom the transaction occurred), time since prior transaction or prior similar transaction (e.g., when the transaction is a car purchase, time since car previously purchased), transaction method, or the like).

Surveys may be sent to users 102 in response to performance of the transactions and consistent with disclosed embodiments. The surveys may be automatically provided by a computing system (e.g., server 104 or another system). The provided surveys may include written surveys (e.g., email, text message, mail, or the like) and/or telephonic surveys (e.g. manual calling, interactive voice response, or the like). The method by which surveys are provided is not intended to be limiting. A survey may include questions concerning the transaction (e.g., the ease of the transaction, the behavior of the counterparty to the transaction, the terms of the transaction, the perceived benefits of the transaction, the relative value of the transaction compared to other potential transactions, or the like). A survey may also include questions concerning future user behavior (e.g., likelihood that the user will repeat the transaction, likelihood that the user will recommend the transaction to others, likelihood that the user will recommend the transaction to others, reasons of unsatisfaction, or the like). The survey may also be configured to enable association of the survey response data with corresponding transaction data. For example, the survey may include a user identifier or a transaction identifier.

Survey response data may be obtained by a computer system (e.g., server 104 or another system). For example, electronic survey response data may be received directly by the computer system, while other forms of survey response data may be input (e.g., scanned or manually entered) to the computer system. The method by which survey response data is received is not intended to be limiting. In some embodiments, additional processing may be performed on survey response data. For example, completed surveys may be analyzed to determine a customer satisfaction level.

In some embodiments, server 104 may be configured to associate the survey response data with corresponding transaction data, thereby creating dataset 106. With reference to FIG. 1, transaction data for transactions associated with users A, B, C, and D may be associated with respective survey response data provided by Users A, B, C, and D. In this example, dataset 106 contains four data points, one for each of Users A, B, C, and D. In some aspects, each data point corresponds to a transaction and includes the (independent) transaction data and the (dependent) survey response data for the transaction. FIG. 1 illustrates a small dataset for simplicity. In practice, datasets would likely be far larger and more complex. For example, a dataset may include many more independent variables, sources (e.g., users), and dependent variables. Additionally, a dataset may include incomplete or null data. For example, users may not respond to surveys, or to all questions in a survey, resulting in independent data that are uncorrelated to dependent data. In some embodiments, the dataset may omit incomplete or uncorrelated data, or indicate missing data using a Not-A-Number symbol, or the like. As would be appreciated by one of skill in the art, in some applications only a small fraction of users that conduct transactions will provide survey response data.

FIG. 2 is a schematic diagram of structures of data records of the collected analytics data in FIG. 1 consistent with disclosed embodiments. FIG. 2 may show details of dataset 106, including the four data points corresponding to Users A, B, C, and D. For example, in FIG. 2, four data records are shown, corresponding to Users A, B, C, and D, respectively. Each data record may include a response value, which may be included in the survey response data in dataset 106. In some embodiments, each data record may include more than one response value. Each data record may further include transaction data and/or survey response data categorized in features, including Features 1-N (N being a positive integer). For example, the response value may be a satisfaction score (e.g., an overall satisfaction score or satisfaction scores by category), and the features may be business metrics concerning the transaction (e.g., transactions in FIG. 1) and/or future user behavior, as described in association with FIG. 1. For example, the business metrics may include a loan application approval rate, an average approval interest of approved loan applications, an overall time from submission of loan application to loan approval, or the like. In some embodiments, the data records may be stored a database format (e.g., a relational or nonrelational dataset format), in which an entry may store a data record corresponding to a user.

Figure 3:
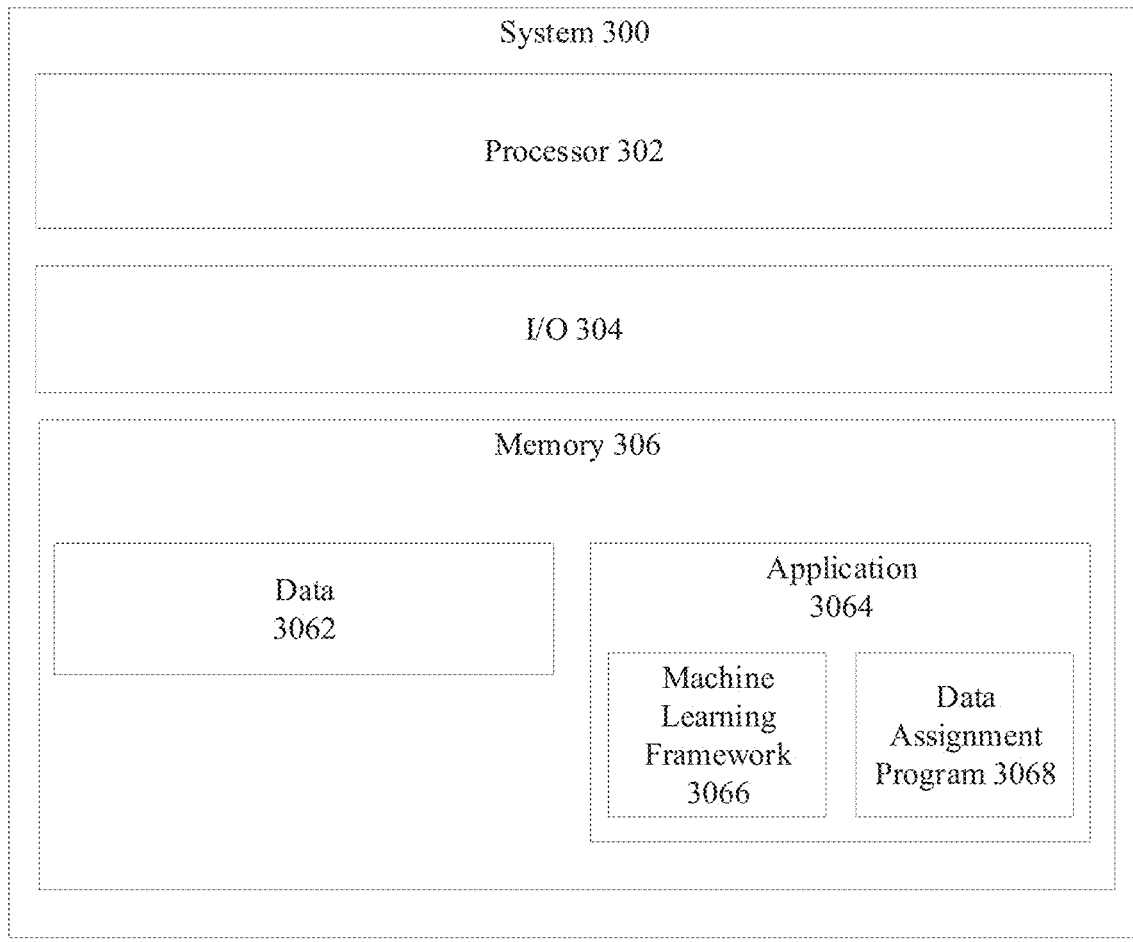
FIG. 3 is a schematic diagram of an example system for determining feature importance of analytics data consistent with disclosed embodiments.

FIG. 3 is a schematic diagram of an example system 300 for determining feature importance of analytics data consistent with disclosed embodiments. System 300 may include a computing device, such as server 104 in FIG. 1. The computing device may include a computer, a smartphone, a server, a server cluster, a plurality of clusters, and/or a cloud service, consistent with disclosed embodiments. As shown, system 300 may include one or more processors 302 for executing instructions stored in a nontransitory memory or medium, one or more I/O devices 304, and one or more memory units 306. In some embodiments, some or all components of system 300 may be hosted on a device, a computer, a server, a cluster of servers, or a cloud service. In some embodiments, system 300 may be a scalable system configured to efficiently manage resources and enhance security by provisioning computing resources in response to triggering events and terminating resources after completing a task (e.g., a scalable cloud service that spins up and terminates container instances).

As will be appreciated by one skilled in the art, the components and arrangement of components included in system 300 may vary. For example, as compared to the depiction in FIG. 3, system 300 may include a larger or smaller number of processors, I/O devices, or memory units. In addition, system 300 may further include other components or devices not depicted that perform or assist in the performance of one or more processes consistent with the disclosed embodiments. The components and arrangements shown in FIG. 3 are not intended to limit the disclosed embodiments, as the components used to implement the disclosed processes and features may vary.

Processor 302 may comprise known computing processors, including a microprocessor. Processor 302 may constitute a single-core or multiple-core processor that executes parallel processes simultaneously. For example, processor 302 may be a single-core processor configured with virtual processing technologies. In some embodiments, processor 302 may use logical processors to simultaneously execute and control multiple processes. Processor 302 may implement virtual machine technologies, or other known technologies to provide the ability to execute, control, run, manipulate, store, etc., multiple software processes, applications, programs, etc. In another embodiment, processor 302 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 302 may execute various instructions stored in memory 306 to perform various functions of the disclosed embodiments described in greater detail below. Processor 302 may be configured to execute functions written in one or more known programming languages.

I/O 304 may include a user interface configured to receive user inputs and provide data to a user (e.g., a data manager). I/O device 304 may include at least one of a display, a printer, a light, an LED, a router, a touchscreen, a keyboard, a mouse, a track pad, a microphone, a speaker, a haptic device, a camera, a button, a dial, a switch, a knob, a transceiver, an input device, an output device, or another I/O device to perform methods of the disclosed embodiments.

I/O device 304 may be configured to manage interactions between system 300 and other systems using a network. In some aspects, I/O device 304 may be configured to publish data received from other databases or systems not shown. This data may be published in a publication and subscription framework (e.g., using APACHE KAFKA), through a network socket, in response to queries from other systems, or using other known methods. Data may be survey data or transaction data, as described herein. In various aspects, I/O 304 may be configured to provide data or instructions received from other systems. For example, I/O 304 may be configured to receive instructions for generating data models (e.g., type of data model, data model parameters, training data indicators, training parameters, or the like) from another system and provide this information to application 3064. As an additional example, I/O 304 may be configured to receive data including sensitive data from another system (e.g., in a file, a message in a publication and subscription framework, a network socket, or the like) and provide that data to application 3064 or store that data in, for example, data 3062 or models 234.

Memory 306 may be a volatile or nonvolatile, magnetic, semiconductor, optical, removable, non-removable, or other type of storage device or tangible (i.e., nontransitory) computer-readable medium for storing instructions consistent with disclosed embodiments. As shown, memory 306 may store data 3062, including one of at least one of encrypted data or unencrypted data. For example, data 3062 may include part or all of dataset 106 or data records shown in FIG. 2. Memory 306 may also store application 3064, such as framework, codes and parameters of a machine learning model.

Application 3064 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Application 3064 may be written in one or more programming or scripting languages. One or more of such software sections or modules of memory 306 may be integrated into a computer system, non-transitory computer-readable media, or existing communications software. Application 3064 may also be implemented or replicated as firmware or circuit logic.

Modules of application 3064 may be configured to receive, retrieve, and/or generate models consistent with disclosed embodiments. Modules of application 3064 may be configured to perform operations in coordination with one another. In some embodiments, application 3064 may be configured to conduct an authentication process, consistent with disclosed embodiments.

In some embodiments, application 3064 may include machine learning framework 3066 (e.g., XGBoost, Tensorflow, or the like) that may include programs (scripts, functions, algorithms) to assist creation of, train, implement, store, receive, retrieve, and/or transmit one or more machine learning models. Machine learning framework 3066 may be configured to assist creation of, train, implement, store, receive, retrieve, and/or transmit, one or more ensemble models (e.g., models comprised of a plurality of models). In some embodiments, training of a model may terminate when a training criterion is satisfied. Training criteria may include number of epochs, training time, performance metric values (e.g., an estimate of accuracy in reproducing test data), or the like. Machine learning framework 3066 may be configured to adjust model parameters and/or hyperparameters during training. For example, machine learning framework 3066 may be configured to modify model parameters and/or hyperparameters (i.e., hyperparameter tuning) using an optimization technique during training, consistent with disclosed embodiments. Hyperparameters may include training hyperparameters, which may affect how training of a model occurs, or architectural hyperparameters, which may affect the structure of a model. Optimization techniques used may include grid searches, random searches, gaussian processes, Bayesian processes, Covariance Matrix Adaptation Evolution Strategy techniques (CMA-ES), derivative-based searches, stochastic hill-climbing, neighborhood searches, adaptive random searches, or the like.

In some embodiments, machine learning framework 3066 may be configured to generate models based on instructions received from another component of system 300 and/or a computing component outside system 300. For example, machine learning framework 3066 may be configured to receive a visual (e.g., graphical) depiction of a machine learning model and parse that graphical depiction into instructions for creating and training a corresponding neural network. Machine learning framework 3066 may be configured to select model training parameters. This selection may be based on model performance feedback received from another component of machine learning framework 3066. Machine learning framework 3066 may be configured to provide trained models and descriptive information concerning the trained models.

Data assignment program 3068 may be configured to select data from data 3062 and create training sets and validation sets, as described herein. Data assignment program 3068 may include a random number generator or a pseudo-random number generator to permit random assignment of individual data points to training sets or validation sets. Data assignment program 3068 may be configured to access information stored in the data 3062, and also to write additional information reflecting assignment to training sets and validation sets to the data 3062. Data assignment program 3068 may be configured to read and write data using SQL PARQUET, AVRO, SQLITE, POSTGRESQL, MYSQL, ORACLE, HADOOP, CSV, JSON, PDF, JPG, BMP, and/or other data formats.

Figure 4:
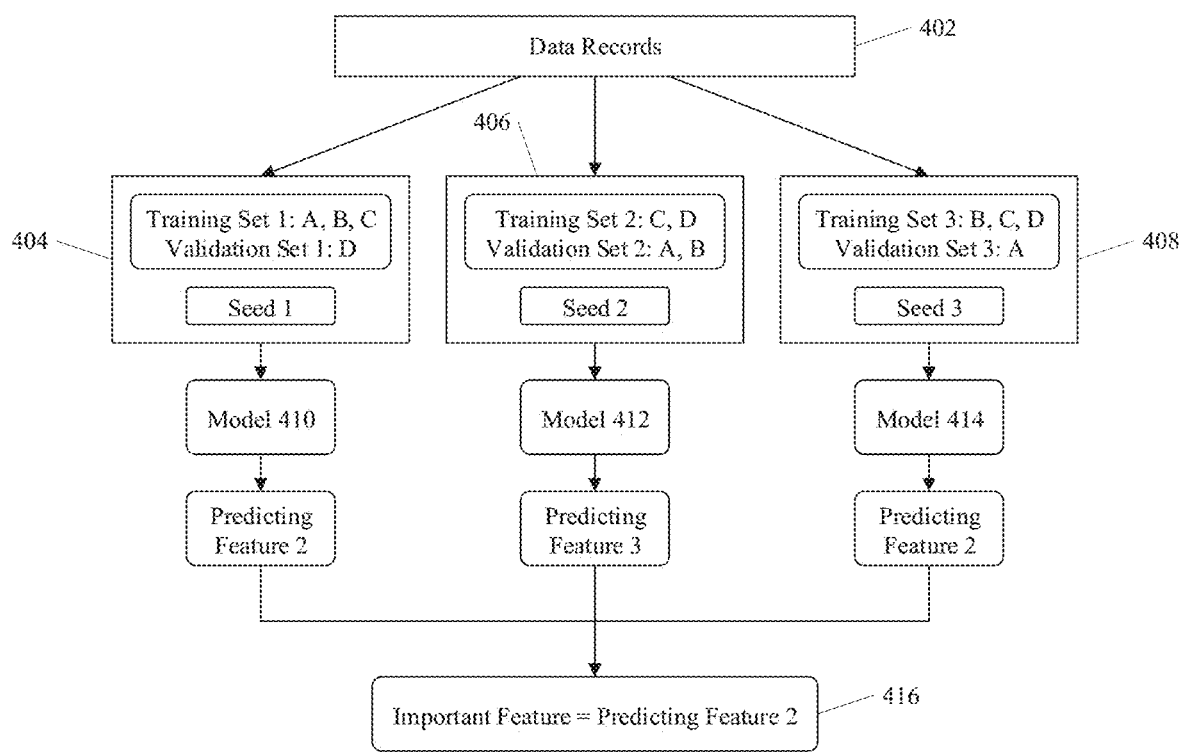
FIG. 4 is a schematic diagram of an example process for determining feature importance of analytics data consistent with disclosed embodiments.

FIG. 4 is a schematic diagram of an example process 400 for determining feature importance of analytics data, consistent with disclosed embodiments. In the nonlimiting example depicted in FIG. 4, data records 402 includes the four data records shown in FIG. 2 corresponding to Users A, B, C, and D (each data record abbreviated as letters "A," "B," "C," and "D," respectively, in FIG. 4). Each data record may include transaction data (e.g., as independent variables) and survey response data (e.g., as dependent variables), which are described in FIG. 1. The number and data type of the independent and dependent variables depicted in this example are not intended to be limiting.

As depicted in FIG. 4, a processor (e.g., processor 302) may be configured to split (e.g., by executing data assignment program 3068) data records 402 to generate input data (including input data 404, input data 406, and input data 408), and further generate machine learning models (e.g., using machine learning framework 3066) based on the input data. Each input data may include a training set and a validation set. The processor may split or partition data records 402 in various forms to generate combinations of training sets and validation sets. For example, input data 404 includes data records A, B, and C as the training set, and includes data record D as the validation set. Input data 406 includes data records C and D as the training set, and includes data record A and B as the validation set. Input data 408 includes data records B, C, and D as the training set, and includes data record A as the validation set. Input data 408 also shows that data records do not need to be sequentially assigned. For instance, training set 3 includes data records B, C, and D, and validation set 3 includes data record A. Each of the input data 404, 406, and 408 may then be used to train models and calculate predicting feature values. In this example, no data record of data records 402 is omitted from a paired training set and validation set, and no data point is repeated between a training set and a validation set in a pair. For instance, in input data 404, each of the four data records are either in training set 1 or validation set 1. Furthermore, data record A is only in training set 1 and not in validation set 1. However, it should be noted that data records 402 may be split in any different manner to generate the training sets and validation sets, not limited to the examples shown herein.

In some embodiments, the processor may generate random seeds (e.g., by executing data assignment program 3068) and associate them with each set of input data, respectively. In some embodiments, the random seeds may have been used to generate the training and validation sets and/or to train the model (e.g., by initializing a random number generator used to generate the training and validation sets and/or used to train the model). For example, random seeds 1, 2, and 3 may be generated and associated with input data 404, 406, and 408, respectively. Accordingly, a machine learning model may be created for each set of input data, including models 410, 412, and 414. In some embodiments, each model may include weights associated with each independent variable.

In FIG. 4, for instance, input data 404 may be used to create model 410. Model 410 may be then evaluated using the validation set from input data 404, yielding a predicting feature. The predicting feature may be determined by model 410 from a plurality of feature (e.g., features 1-N in FIG. 2) included in input data 404 (e.g., stored as the structures shown in FIG. 2). For example, model 410 may be configured to determine contributions of influence level of each of the features has in predicting the response value, and select the feature having the highest contribution of influence level as the predicting feature. For example, in FIG. 4, models 410-414 determine feature 2, feature 3, and feature 2 as the predicting features, respectively. Based on the predicting features, an important feature 416 may be determined. For example, a frequency of each predicting feature may be calculated, and the feature having the highest frequency among the predicting features may be determined as important feature 416. In FIG. 4, feature 2 has the highest frequency in the three predicting features outputted by models 410-414, and important feature 416 is determined as feature 2, accordingly.

It should be noted that, although FIG. 4 shows that only one predicting feature is generated for each model (e.g., models 410, 412, and 414), in some embodiments, a predetermined number of predicting features having the highest contributions of influence levels can be generated for each model. For example, "top N" predicting features can be generated for each model, in which N is an integer. The top N predicting features can be the first N predicting features after ranking all predicting features corresponding to the model by contributions of influence levels in a descending order.

In some embodiments, multiple important features may be determined based on the predicting features. The multiple important features may be one or more features determined to have influence in predicting the response value, the influence exceeding a predetermined threshold (e.g., a predetermined frequency threshold). For example, in FIG. 4, if the predetermined frequency threshold is 60%, feature 2 may be determined as the important feature 416. It should be noted that FIG. 4 only shows an example of determining the multiple important features and should not limit embodiments of this disclosure.

In some embodiments, each predicting feature may be weighted in determining the important feature. For example, input data 404, 406, 408 may be generated to have different characteristics (e.g., different sizes), and different weights may be assigned to their corresponding predicting features, such as 20%, 60%, and 20%, respectively. When determining the important feature, each predicting feature may carry a weight corresponding to the input data where it is determined from. In the above example, in FIG. 4, the frequency of feature 3 may be 0.6, and the frequency of feature 2 may be 0.2, and the important feature may be determined as feature 3 (different from important feature 416 in FIG. 4). In some aspects, the weight of a given predicting feature may be based on the sample sizes of the underlying data, the values of the underlying data, the features associated with the corresponding models for the predicting features, the models for the predicting features, the frequencies of the predicting features, new data received at the system, or any other data consistent with the disclosed embodiments (including data for a given dataset or sets of data for several datasets). In some embodiments, the weights may be dynamic such that the system updates the set of weights based on detected changes to the underlying data or other detected changes to the information upon which the weights are based. For example, the weight of a predicting feature from data 404 may be a first value (e.g., 0.2) at a first time but, based on detected changes to the data 404, its model 410, new data, etc., may change to a second value (e.g., 0.5) at a second time.

In some embodiments, each of models 410-414 may determine more than one predicting features, all of which may be used to determine the important feature, such as being used for calculating the frequencies. In some embodiments, each model may determine the same number of predicting features. In some embodiments, each model may determine different numbers of predicting features. It should be noted that any combination of any method may be used to determine the important feature, including but not limited to any combination of the above-mentioned examples.

In some embodiments, an area under receiver operating characteristics (AUROC) may be further determined for each model. As may be appreciated, other predicting variables, such as an area under curve (AUC), may be chosen—this example is not intended to be limiting. In some aspects, the AUROC may be analyzed to determine statistics of the AUROC values. For example, a distribution of AUROC values may be estimated by a processor (e.g., processor 302). This estimated distribution may be analyzed by the processor to determine whether an accuracy criterion for the machine learning models has been satisfied. In some embodiments, an average AUROC value may be determined, which may be compared to a predetermined threshold value. Alternatively, the accuracy criterion may depend on one or more of the standard deviation, mean, median, mode, or other statistic of the estimated distribution. In some embodiments, based on the comparison, a confidence interval for the AUROC may be determined.

Figure 5:
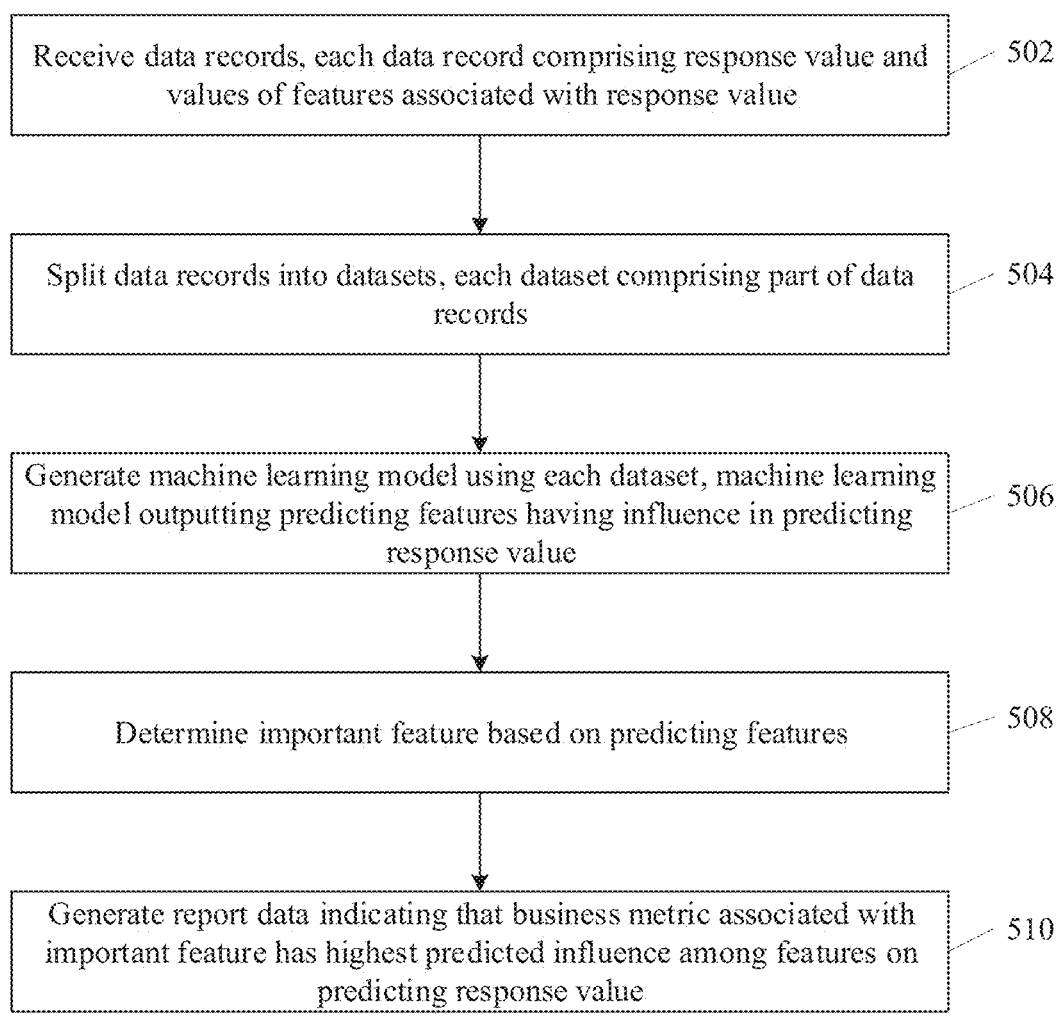
FIG. 5 is a flowchart of an example method for determining feature importance of analytics data consistent with disclosed embodiments.
Figure 6:
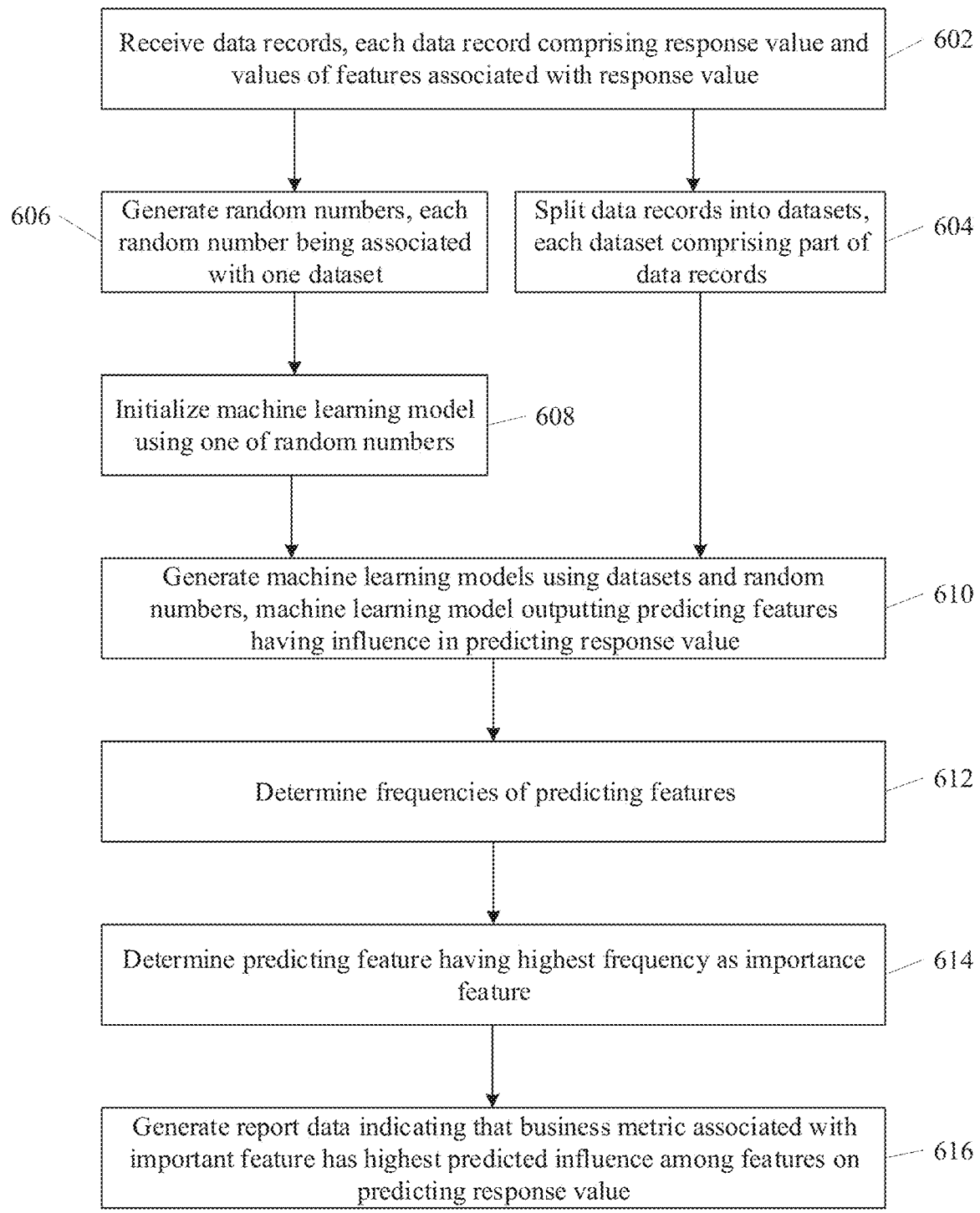
FIG. 6 is a flowchart of another example method for determining feature importance of analytics data consistent with disclosed embodiments.

FIGS. 5-6 show example methods 500-600 consistent with embodiments of this disclosure. Methods 500-600 may be performed using one or more computing devices described herein (e.g., system 300, and/or server 104, etc.). For example, one or more processors (e.g., processor 302 of FIG. 3) may execute instructions or codes (e.g., application 3064) on data (e.g., data 3062) stored in one or more memories (e.g. memory 306) to implement methods 500-600. While the same computing devices are described as performing each step of methods 500-600 for simplicity of description, different computing devices or groups of computing devices may be used to perform different steps (or different functions within each step).

FIG. 5 is a flowchart of an example method 500 for determining feature importance of analytics data consistent with disclosed embodiments. Consistent with disclosed embodiments, method 500 may include steps 502-510. In some aspects, the steps of method 500 may be combined, omitted, reordered, and/or integrated into other processes (e.g., process 600) to perform the tasks contemplated herein.

At step 502, a processor (e.g., processor 302) may receive data records. In some aspects, each data record may include a response value and values of features associated with the response value. In some embodiments, the data records may be received from a customer data collector. For example, the customer data collector may be an individual or an institution in financial systems, supply line management, transportation, industrial processes, or government. For example, in one embodiment, the customer data collector may be a loan provider (e.g., an automobile loan provider). For example, the data records may include survey data records, such as dataset 106, data records in FIG. 2, or data records 402 in FIG. 4.

In some embodiments, the response value may represent a satisfaction level directed to the customer data collector, such as a satisfaction score (e.g., a customer satisfaction score), an evaluation score, or any numerical or non-numerical value in response to a customer survey. The features may include business metrics, attributes, or predictors that concern the transaction (e.g., the ease of the transaction, the behavior of the counterparty to the transaction, the terms of the transaction, the perceived benefits of the transaction, the relative value of the transaction compared to other potential transactions, or the like) or future user behavior (e.g., likelihood that the user will repeat the transaction, likelihood that the user will recommend the transaction to others, reasons of unsatisfaction, or the like). For example, the features may be features 1-N in FIG. 2. The values of features may be used as independent variables (or "predictive variables") of method 500. The response value may be used as a dependent value (or "target variables") in method 500, which may be predicted based on the predictive variables. In some embodiments, the values of the features may include a metric value representing an operational performance of the customer data collector (e.g., an automobile loan provider). The operational performance may include, for example, a loan application approval rate, an average approval interest of approved loan applications, an overall time from submission of loan application to loan approval, or the like.

At step 504, the data records may be split into datasets. Each dataset may include a part of the data records. For example, dataset may include a training dataset (e.g., training sets 1, 2, or 3 in FIG. 4) for training the machine learning model and a validation dataset (e.g., validation sets 1, 2, or 3 in FIG. 4) for validating the machine learning model. In some embodiments, the data records may be split using a row subsampling method, a column subsampling method, or a combination of them.

In the row subsampling method, different data records that include all the features may be selected to form the training datasets and the validation datasets. For example, if each data record includes features 1-N as shown in FIG. 2, and the data records include datasets A, B, C, and D as shown in FIG. 4, and assuming that input data 404 (including training set 1 and validation set 1) in FIG. 4 is generated using the row subsampling method, then each of datasets A, B, C, and D in training set 1 and validation set 1 may have all of the features 1-N. In the column subsampling method, different features from the same or different data records may be selected to form the training datasets and the validation datasets. For example, if each data record includes features 1-N as shown in FIG. 2, and the data records include only datasets A, B, C, and D, assuming that input data 406 (including training set 2 and validation set 2) in FIG. 4 is generated using the column subsampling method, then each of datasets A, B, C, and D in training set 2 and validation set 2 may include features 1, 3, 5, and 7 only. When the row subsampling method and the column sampling method are combined, different data records that include some or part of the features may be selected to form the training datasets and the validation datasets. For example, if each data record includes features 1-N as shown in FIG. 2, and the data records include datasets A, B, C, D, and other datasets, and assuming that input data 408 (including training set 3 and validation set 3) in FIG. 4 is generated using the combination of the row subsampling method and the column sampling method, then each of datasets A, B, C, and D in training set 3 and validation set 3 may include features 2, 4, 6, and 8 only.

It should be noted that the data records may be split using any method herein, and the contemplated splitting processes are not limited to the above examples. For example, not all of the data records need to be split into the training datasets or validation datasets. That is, one or more data records may never be used. For another example, not all of the features need to be used for training the machine learning model. That is, one or more features of the data records may never be used.

Still referring to FIG. 5, at step 506, a machine learning model may be generated using each of the datasets. The machine learning model may output one or more predicting features having influence in predicting the response value for each of the datasets. For example, the machine learning models may be models 410-414 in FIG. 4. In some embodiments, the machine learning model may include a decision-tree based model, such as a gradient boosting machine model, a decision tree model, or a random forest model. For example, the gradient boosting machine model may use XGBoost software library. The predicting feature may be one of the features of the data records. For example, the predicting features may be from the features 1-N in FIG. 2 or FIG. 4.

Each of the features may have influence in predicting the response value. In some embodiments, feature importance values may be determined using the machine learning model. Each feature importance value may represent a contribution of influence level of a respective one of the features has in predicting the response value. The predicting feature may be determined based on the feature importance values. In some embodiments, the predicting feature may reflect a feature having a highest contribution of influence level among the feature importance values. In some embodiments, the machine learning model may output one or more predicting features that reflect one or more features having contribution of influence level exceeding a predetermined threshold. In some embodiments, the predetermined threshold may be dynamic, such as based on user input, precision requirement, sizes of datasets, types of features, or the like.

For example, when the machine learning model is a decision tree model, a feature may be used as a reference variable on which nodes of the decision tree split. In this example, the feature importance value a feature may be the frequency or times of the feature being used for splitting. The more times (or higher frequency) a feature is used for splitting the decision tree, the greater influence the feature may be determined to have in predicting the response value.

For another example, when the machine learning model is a decision tree model, an information gain or an information entropy may be determined each time the nodes of the decision tree splitting on a feature. The information gain or information entropy may be accumulated for the same feature. After the decision tree model is generated, a total information gain or a total information entropy may be determined for the decision tree, such as by combining the accumulated information gain or information entropy of the features. In this example, the feature importance value of a feature may be a ratio of an accumulated information gain or accumulated information entropy of the feature over the total information gain or the total information entropy. The higher the ratio is, the greater influence the feature may be determined to have in predicting the response value.

For another example, when the machine learning model is a decision tree model, a Gini index may be determined for each feature on which a node of the decision tree split. After the decision tree model is generated, Gini indices of the same feature may be aggregated, such as by summation. In this example, the feature importance value of a feature may be the aggregated Gini index of the feature. The smaller the aggregated Gini index of the feature is, the greater influence the feature may be determined to have in predicting the response value. It should be noted that any combination of any type of methods of determining the influence of the features may be used herein and not limited to any combination of the above examples.

In some embodiments, random numbers may be generated. Each random number may be associated with one of the datasets. For example, the random numbers may be random seeds 1, 2, and 3 in FIG. 4. In some embodiments, a machine learning model may be generated using a dataset and a random number. For example, the random numbers may be used to initialize the machine learning model. For another example, the random numbers may be used to splitting the data records into the datasets.

Still referring to FIG. 5, at step 508, an important feature may be determined based on the predicting features. The important feature may be a feature determined to have the actual highest influence in predicting the response value. In some embodiments, the important feature may be determined based on frequencies of the predicting features determined at step 506. For example, a frequency of each of the predictive features may be determined, and the important feature may be determined based on a predicting feature associated with a highest frequency. For example, as shown in FIG. 4, feature 2 have the highest frequency among all three predicting features, and thus feature 2 is determined as important feature 416. In some embodiments, multiple important features may be determined based on the predicting features. The multiple important features may be one or more features determined to have influence in predicting the response value, the influence exceeding a predetermined threshold (e.g., a predetermined frequency threshold).

In some embodiments, an area under receiver operating characteristics (AUROC) for the machine learning model may be determined, and a confidence interval for the AUROC may be determined. The AUROC and the confidence interval may be used to determine the predicting power (e.g., an accuracy rate of prediction) of the machine learning model. For example, based on the AUROC, one or more parameters of the machine learning model may be adjusted to improve towards increasing its predicting power.

At step 510, report data may be generated, which may indicate that a business metric associated with the important feature has the highest predicted influence among the features received at step 502 on predicting the response value. In some embodiments, the report data may indicate relative predicted influences of business metrics respectively associated with the features on predicting the response value. For example, the report data may include a textual report, a graph, a table, an email, an electronic data record, a database entry, a recommendation, or the like. The report data may be printed, displayed on a screen, communicated via a network, stored in a database, stored in a computer (e.g., a local computer or a cloud server), or the like. In some embodiments, the report data may highlight, emphasize, or recommend one or more important features with the highest predicted influence on the business metric among the features received at step 502. In some embodiments, the report data may be presented (e.g., displayed on a screen, printed on papers, sent via emails, popped up as a smartphone push notification, or the like) to an individual or an entity related to the business metric, such as a manager, a department, an organization, or the like.

In some embodiments, based on the report data, actions or plans may be taken to improve or optimize the business metric. By improving the business metric, customer satisfaction may be improved. For example, if the important feature is associated with the ease of the transaction, it indicates that the ease of the transaction has the most influence in customer satisfaction. Accordingly, the difficulty or hurdles of the transaction process may be reduced or eliminated for improving the customer satisfaction.

In some embodiments, process 500 can be applied to optimize a banking business. For example, the data records at step 502 can be customer survey data (e.g., collected from survey forms or online survey sites). The response values in the data records can be satisfaction ratings from 1 to 10, for example. The features associated with the response values can be evaluations of different dimensions of user experience of customers' past transactions, for example. The features associated with the response values can also be related to objective data of those past transactions and can include some business metrics that related to the operation of the banking business. For example, the business metrics can include a loan application approval rate, an average approval interest of approved loan applications, an overall time from submission of loan application to loan approval, average days to fund a loan, or the like. The important feature determined at step 508 may be the average days to fund a loan. Accordingly, at step 510, report data may be generated to indicate that the average days to fund a loan (e.g., representing the funding speed) has the highest influence among other business metrics in affecting customer satisfaction. After step 510, the bank may test and launch a fast funding program for improving customer experience.

In some embodiments, at step 510, report data can be generated to indicate multiple business metrics that affect customer satisfaction, and the business metrics may be ranked in the report data by their influence on the customer satisfaction in a descending or ascending order. For example, from the highest influence to the lowest influence on the customer satisfaction, the report data can rank the business metrics as: the average days to fund a loan, the overall time from submission of loan application to loan approval, the loan application approval rate, and the average approval interest of approved loan applications. After step 510, the bank may initiate different actions or plans with different priority levels in accordance with the ranked influence of the business metrics for improving customer experience. It is noted that the specific methods for optimizing the business metric is not limited in this disclosure.

FIG. 6 is a flowchart of another example method 600 for determining feature importance of analytics data consistent with disclosed embodiments. Consistent with disclosed embodiments, method 600 includes steps 602-616. In some aspects, the steps of method 600 may be combined, omitted, reordered, and/or integrated into other processes (e.g., process 600) to perform the tasks contemplated herein.

At step 602, a processor (e.g., processor 302) may receive data records (e.g., data records including survey data records such as those described in connection with FIGS. 1, 2, 4, and 5). Each data record may include a response value and values of features associated with the response value as otherwise disclosed herein. Step 602 may be implemented in a way similar to step 502.

At step 604, the data records may be split into datasets. Each dataset may include a part of the data records (e.g., training datasets, validation data sets, etc., such as those discussed in reference to FIGS. 4 and 5). In some aspects, step 604 may be implemented in a way similar to step 504.

At step 606, random numbers may be generated, such as using processes consistent with those described for FIG. 5. Each random number may be associated with one of the datasets. For example, the random numbers may be random seeds 1, 2, and 3 in FIG. 4.

At step 608, each of the machine learning models may be initialized using one of the random numbers. For example, models 410-414 in FIG. 4 may be initialized using random seeds 1, 2, and 3, respectively.

At step 610, a machine learning model may be generated using each of the datasets and one of the random numbers. The machine learning model may output one or more predicting features having influence in predicting the response value for each of the datasets. Step 610 may be implemented in a way similar to step 506.

At step 612, a frequency of each of the predictive features may be determined. At step 614, the important feature is determined based on a predicting feature associated with a highest frequency. For example, as shown in FIG. 4, feature 2 have the highest frequency among all three predicting features, and thus feature 2 is determined as important feature 416. In some embodiments, multiple important features may be determined as one or more predicting features associated with one or more frequencies exceeding a predetermined frequency threshold.

At step 616, report data may be generated, which may indicate that a business metric associated with the important feature has a highest predicted influence among the features received at step 602 on predicting the response value. Step 616 may be implemented in a way similar to step 510.

Systems and methods disclosed herein involve unconventional improvements over prior methods of analyzing customer analytics data. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include software, but methods consistent with the present disclosure may be implemented as hardware alone.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JavaScript, C, C++, Java, PHP, Python, Ruby, Perl, or other programming or scripting languages. One or more of such software sections or modules may be integrated into a computer system, non-transitory computer-readable media, or existing communications software. The programs, modules, or code may also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for determining feature importance of analytics data in predicting a response value, the system comprising:
    at least one processor; and
    at least one non-transitory memory storing instructions to perform operations when executed by the at least one processor including:
        receiving data records, each data record comprising a response value and values of features associated with the response value;
        splitting the data records into datasets, each dataset comprising a part of the data records;
        generating a machine learning model using each of the datasets, the machine learning model outputting one or more predicting features having influence in predicting the response value for each of the datasets;
        determining an important feature based on the one or more predicting features; and
        generating report data indicating that a business metric associated with the important feature has the highest predicted influence among the features on predicting the response value.

2. The system of claim 1, wherein the data records are received from a customer data collector.

3. The system of claim 2, wherein the data records comprise survey data records.

4. The system of claim 2, wherein the values of the features comprise a metric value representing an operational performance of the customer data collector.

5. The system of claim 2, wherein the response value represents a satisfaction level directed to the customer data collector.

6. The system of claim 1, wherein the operations further comprise:
    determining random numbers, each random number being associated with one of the datasets; and
    generating the machine learning model using the each of the datasets and one of the random numbers.

7. The system of claim 6, wherein the generating the machine learning model comprises initializing the machine learning model using the one of the random numbers.

8. The system of claim 1, wherein the machine learning model comprises one of a gradient boosting machine model, a decision tree model, or a random forest model.

9. The system of claim 1, wherein each of the datasets comprises a training dataset for training the machine learning model and a validation dataset for validating the machine learning model.

10. The system of claim 1, wherein the operations further comprise:
    determining feature importance values using the machine learning model, wherein each feature importance value represents a contribution of influence level of a respective one of the features has in predicting the response value; and
    determining the one or more predicting features based on the feature importance values.

11. The system of claim 10, wherein the one or more predicting features reflect features having a predetermined number of highest contributions of influence level among the feature importance values.

12. The system of claim 1, wherein determining the important feature comprises:
    determining a frequency of each of the one or more predicting features; and
    determining the important feature based on a predicting feature associated with a highest frequency.

13. The system of claim 1, wherein operations further comprise:
    determining an area under receiver operating characteristics (AUROC) for the machine learning model; and
    determining a confidence interval for the AUROC.

14. A computer-implemented method for determining feature importance of analytics data in predicting a response value, the method comprising:
    receiving data records, each data record comprising a customer satisfaction score and values of features associated with the response value;
    splitting the data records into datasets, each dataset comprising a training dataset for training a machine learning model and a validation dataset for validating the machine learning model;
    generating the machine learning model using each of the datasets, the machine learning model outputting one or more predicting features having influence in predicting the response value for each of the datasets;

determining an important feature based on the one or more predicting features; and generating report data indicating that a business metric associated with the important feature has the highest predicted influence among the features on predicting the response value.

15. The method of claim 14, further comprising:

determining random numbers, each random number being associated with one of the datasets; and generating the machine learning model based on the datasets and one of the random numbers.

16. The method of claim 15, wherein generating the machine learning model further comprises initializing the machine learning model using one of the random numbers.

17. The method of claim 14, wherein the machine learning model comprises one of a gradient boosting machine model, a decision tree model, or a random forest model.

18. The method of claim 14, further comprising:

determining feature importance values using the machine learning model, wherein each feature importance value represents a contribution of influence level of a respective one of the features has in predicting the response value; and determining the one or more predicting features as features having feature importance values representing a predetermined number of highest contributions of the influence level.

19. The method of claim 14, further comprising:

determining a frequency of each of the one or more predicting features; and determining the important feature based on a predicting feature associated with a highest frequency.

20. A non-transitory computer-readable storage medium comprising instructions for determining feature importance of analytics data in predicting a response value, wherein instructions when executed by a processor perform operations comprising:

receiving survey response data records, each survey response data record comprising a response value and values of features associated with the response value;

splitting the data records into datasets, each dataset comprising a part of the data records;

generating a machine learning model using each of the datasets, the machine learning model outputting one or more predicting features having influence in predicting the response value for each of the datasets;

determining an important feature based on the one or more predicting features; and generating report data indicating that a business metric associated with the important feature has the highest predicted influence among the features on predicting the response value.

* * * * *